US011718960B2

(12) United States Patent
Lewis et al.

(10) Patent No.: US 11,718,960 B2
(45) Date of Patent: Aug. 8, 2023

(54) COMPOSITION FOR PROVIDING GREASE AND WATER RESISTANT PROPERTIES WITHOUT USE OF A FLUORINATED COMPOUND, METHOD OF MAKING THE COMPOSITION, AND PULP MOLDED ARTICLE MADE BY THE METHOD THEREOF

(71) Applicant: Eco-Products, PBC, Boulder, CO (US)

(72) Inventors: Mark Lewis, Dayton, WA (US); Steve Rosse, Louisville, CO (US)

(73) Assignee: Eco-Products, PBC, Boulder, CO (US)

( * ) Notice: Subject to any disclaimer, the term of this patent is extended or adjusted under 35 U.S.C. 154(b) by 365 days.

(21) Appl. No.: 16/839,340

(22) Filed: Apr. 3, 2020

(65) Prior Publication Data

US 2020/0318288 A1 Oct. 8, 2020

Related U.S. Application Data

(60) Provisional application No. 62/829,368, filed on Apr. 4, 2019.

(51) Int. Cl.
*D21H 11/12* (2006.01)
*D21H 17/17* (2006.01)
(Continued)

(52) U.S. Cl.
CPC .............. *D21H 11/12* (2013.01); *A47G 19/02* (2013.01); *B65D 1/34* (2013.01); *D21H 17/17* (2013.01);
(Continued)

(58) Field of Classification Search
USPC .... 428/34.2; 162/158, 164.1, 179, 185, 218, 162/228, 231
See application file for complete search history.

(56) References Cited

U.S. PATENT DOCUMENTS

2004/0005341 A1* 1/2004 Dixit ...................... D21H 21/16
424/401
2004/0191437 A1* 9/2004 Asayama .............. B31F 1/0077
428/34.2
(Continued)

FOREIGN PATENT DOCUMENTS

WO 2019/045732 A1 3/2019
WO 2020/041251 A1 2/2020

OTHER PUBLICATIONS

"What is Bagasse Material?", Buzz Catering, 2018, 4 pages, [online], retrieved from the internet, [retrieved Jun. 14, 2022], <URL: https://www.buzzcateringsupplies.com/catering-blog/article/what-is-bagasse-material>. (Year: 2018).*

(Continued)

*Primary Examiner* — Dennis R Cordray
(74) *Attorney, Agent, or Firm* — Nelson Mullins Riley & Scarborough LLP

(57) ABSTRACT

A food-safe composition and resulting article with grease and water resistance properties comprised of a petroleum wax based aqueous emulsion, a food-safe coating formulation, and an alkyl ketene dimer (AKD), wherein the composition exhibits grease and water resistant properties without a fluorinated compound present in the composition. A method of making the composition and a method of using the composition to form pulp molded articles such as food-safe containers and other pulp-based food packaging and utensils are provided.

12 Claims, 1 Drawing Sheet

(51) Int. Cl.
    *D21H 17/60*     (2006.01)
    *D21H 19/22*     (2006.01)
    *D21H 21/16*     (2006.01)
    *D21J 3/00*     (2006.01)
    *A47G 19/02*     (2006.01)
    *B65D 1/34*     (2006.01)

(52) U.S. Cl.
    CPC .............. *D21H 17/60* (2013.01); *D21H 19/22* (2013.01); *D21H 21/16* (2013.01); *D21J 3/00* (2013.01)

(56) References Cited

U.S. PATENT DOCUMENTS

| | | |
|---|---|---|
| 2009/0104314 A1 | 4/2009 | Dellinger et al. |
| 2010/0018660 A1* | 1/2010 | Varnell ................. D21H 17/17 524/53 |
| 2016/0053438 A1 | 2/2016 | Brungardt |
| 2018/0030660 A1 | 2/2018 | Chung et al. |
| 2018/0371694 A1 | 12/2018 | Husband et al. |
| 2020/0063373 A1 | 2/2020 | Parker et al. |
| 2020/0206271 A1 | 7/2020 | Lu et al. |

OTHER PUBLICATIONS

International Search Report and Written Opinion, PCT/US20/26602, dated Jun. 23, 2020, 14 pages.
International Preliminary Report on Patentability, PCT/US20/26602, dated Sep. 28, 2021, 13 pages.
Supplemental European Search Report and Search Opinion of European Patent Application No. 20783468.0, dated Dec. 6, 2022, all enclosed pages cited.

* cited by examiner

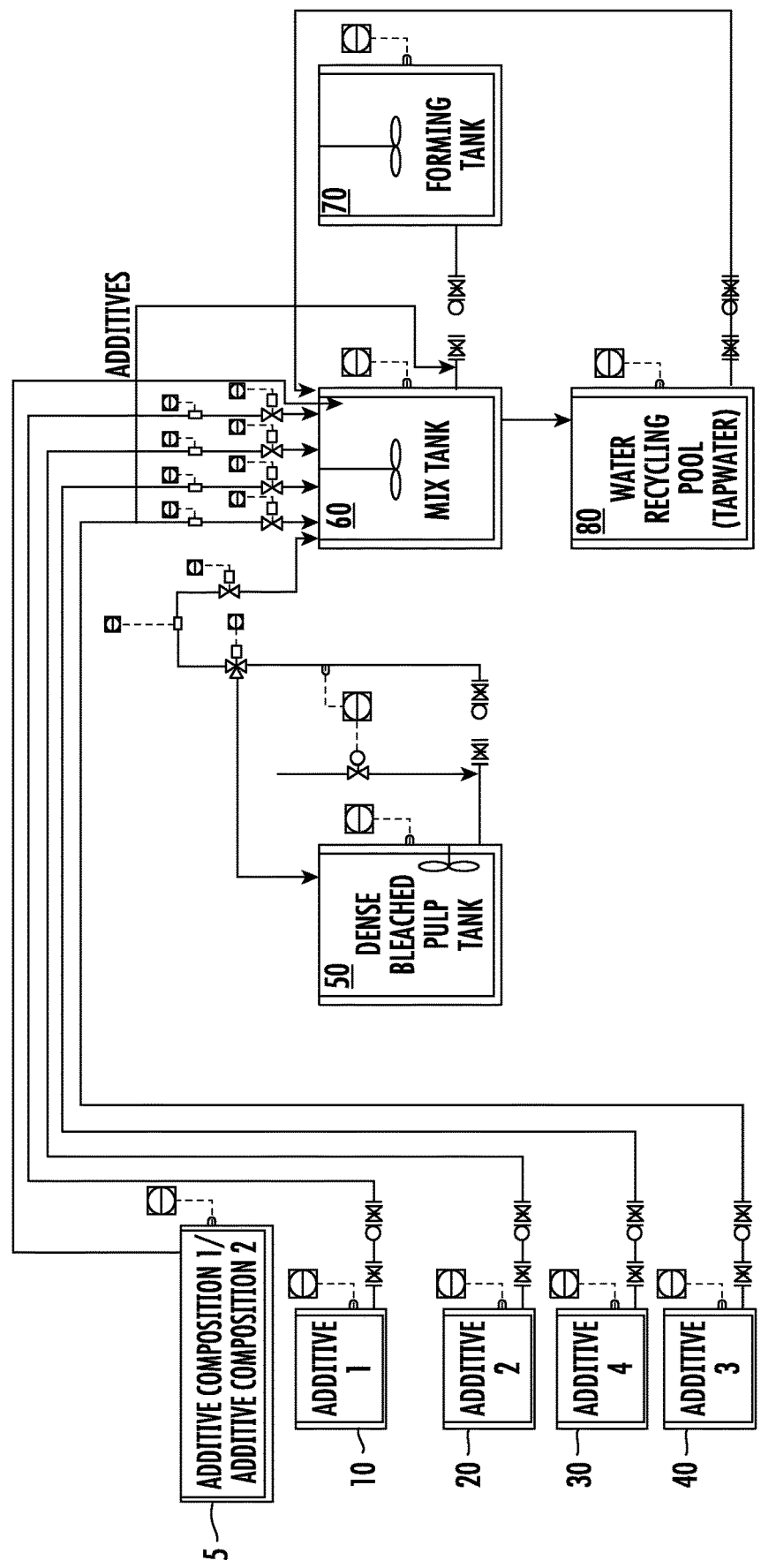

COMPOSITION FOR PROVIDING GREASE AND WATER RESISTANT PROPERTIES WITHOUT USE OF A FLUORINATED COMPOUND, METHOD OF MAKING THE COMPOSITION, AND PULP MOLDED ARTICLE MADE BY THE METHOD THEREOF

CROSS-REFERENCES TO RELATED APPLICATIONS

This is a utility patent application claiming priority from U.S. Provisional Patent Application No. 62/829,368, filed on Apr. 4, 2019, in the United States Patent and Trademark Office. The disclosure of which is incorporated herein by reference in its entirety.

FIELD OF THE INVENTION

The present invention relates to pulp molded articles for containing food, more particularly to such pulp molded articles having grease and water resistant properties.

BACKGROUND OF THE INVENTION

In the foodservice packaging industry, pulp molded articles to be used as food packaging materials are manufactured to safely contain food for consumption at food service operations or to transport from food service operations. These articles must be safe for food and are desirably resistant to grease and water to prevent food from leaking or staining places or items that people do not want soiled. The foodservice packaging industry has been using FDA approved chemicals to provide that functional resistance for many years. However, these chemicals that are currently being used are fluorinated compounds.

There have been recent studies by several non-governmental organizations that are being used by those organizations to raise awareness of the concern about fluorinated compounds and their impact on human health despite the FDA approval. Further the Biodegradable Products Institute which is the leading certification body for compostability has set a total fluorine limit that was to go into effect on Jan. 1, 2020, and which is meant to eliminate intentionally added fluorinated compounds. There are efforts to show that these compounds are bio accumulative and as such would "pool" in compost that could be applied to crops and thus be available to plants and their fruit. As such, there is a desire and need in the industry to identify alternative wet end chemistries that do not use fluorinated compounds but deliver similar grease and water resistant properties.

SUMMARY OF THE INVENTION

The present invention relates to a chemical composition, method of making, and a pulp molded article for containing food made therefrom without a fluorinated compound.

In an embodiment of the invention, a pulp molded article is provided. The article comprises a natural fiber, an alkyl ketene dimer (AKD), a food-safe coating formulation, and a petroleum wax based aqueous emulsion.

In an embodiment of the invention, a pulp molded article comprises at least 95% of a natural fiber, at least 0.15% of an alkyl ketene dimer (AKD), at least 0.1% of a petroleum wax based aqueous emulsion, and less than 1% vinyl acetate-vinyl alcohol polymer wherein the article exhibits grease resistant properties and is suitable for food contact.

In an embodiment of the invention, an article comprises: 96% to 99.65% of a natural fiber, 0.15% to 1.1% of an alkyl ketene dimer (AKD), 0.1% to 1.9% of a food-safe coating formulation, and 0.1% to 1% of a petroleum wax based aqueous emulsion, wherein the percentages are weight percentages based on dry weight formulation of the article.

In other embodiments of the invention, the article is molded from a pulp composition. The article is formed as a tray, a container, a plate, a bowl, a utensil, a lid, or a cup. The article is compostable in an industrial composting facility. The article has a thickness of less than 2 millimeters. The article has a thickness of at least 0.5 millimeters.

In an embodiment of the invention, an additive composition is provided. The additive composition comprises a food-safe coating formulation, a petroleum wax based aqueous emulsion, and an alkyl ketene dimer (AKD).

In an embodiment of the invention, an additive composition comprises a petroleum wax based aqueous emulsion, and an alkyl ketene dimer (AKD).

In an embodiment of the invention, a pulp-based composition is provided. The pulp-based composition comprises 0.1 weight % to 10 weight % of a petroleum wax based aqueous emulsion, 0.1 weight % to 10 weight % of a food-safe coating formulation, 0 weight % to 0.5 weight % of a cationic polymer, 0.1 weight % to 10 weight % of an alkyl ketene dimer, and 69.5 weight % to 99.7 weight % of pulp, wherein weight percentages are based on the total weight of the pulp-based composition.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 1 is a process flow diagram illustrating an embodiment of the present invention.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

In an embodiment of the invention, an additive composition having grease and water resistance without the use of a fluorinated compound is provided. The additive composition is for use in a wet end of a paper pulping machine or process. The term "wet end" is a general term for parts of a paper making machine or process that involve a slurry of fibers, fillers, and other additives. The "dry end" of a paper machine is typically where a roll of paper is being formed. The rough dividing line between the wet end and the dry end is often drawn at the wet-press section which is the last place in which water is pulled from the wet web of paper. One exception to this rule is the size press because size press treatments can be closely related to what happens in the wet end. The beginning of the wet end is often considered to be at the main refiner system since most papermaking chemicals are added after that point.

In accordance with an embodiment of the invention, an additive composition comprises, consists essentially of, or consists of: a food-safe coating formulation, a petroleum wax based aqueous emulsion, and an alkyl ketene dimer (AKD). This additive composition is referred to herein and in FIG. 1 as "Additive Composition 1."

Additive Composition 1 is an emulsification of 35 weight % to 55 weight % of the food-safe coating formulation, 15 weight % to 35 weight % of the petroleum wax based aqueous emulsion, and 20 weight % to 40 weight % of the AKD, with weight percentages being based on the total weight of the additive composition, and resulting in a final emulsion which is 15 weight % to 35 weight % of total active solids of which 1 weight % to 20 weight % is the food-safe coating formulation, 1 weight % to 20 weight % is the wax emulsion, and 1 weight % to 10 weight % is the AKD. The chemicals are emulsified for a period of time to assure the emulsion will stay in suspension.

Preferably, Additive Composition 1 is an emulsification of 40 weight % to 50 weight % of the food-safe coating formulation, 20 weight % to 30 weight % of the petroleum wax based aqueous emulsion, and 25 weight % to 35 weight % of the AKD, with weight percentages being based on the total weight of the additive composition, and resulting in a final emulsion which is 20 weight % to 30 weight % of total active solids of which 8 weight % to 12 weight % is the food-safe coating formulation, 8 weight % to 12 weight % is the wax emulsion, and 4 weight % to 6 weight % is the AKD. The chemicals are emulsified for a period of time to assure the emulsion will stay in suspension.

In accordance with another embodiment of the invention, an additive composition comprises, consists essentially of, or consists of: a petroleum wax based aqueous emulsion, and an alkyl ketene dimer (AKD). This additive composition is referred to herein and in FIG. 1 as "Additive Composition 2."

Additive Composition 2 is an emulsification of 50 weight % to 70 weight % of the petroleum wax based aqueous emulsion, and 30 weight % to 50 weight % of the AKD, with weight percentages being based on the total weight of the additive composition, and resulting in a final emulsion which is 10 weight % to 35 weight % of total active solids of which, 5 weight % to 20 weight % is wax emulsion and 1 weight % to 20 weight % is AKD. The chemicals are emulsified for a period of time to assure the emulsion will stay in suspension.

Preferably, Additive Composition 2 is an emulsification of 55 weight % to 65 weight % of the petroleum wax based aqueous emulsion, and 35 weight % to 45 weight % of the AKD, with weight percentages being based on the total weight of the additive composition, and resulting in a final emulsion which is 15 weight % to 30 weight % of total active solids of which, 10 weight % to 15 weight % is wax emulsion and 8 weight % to 12 weight % is AKD. The chemicals are emulsified for a period of time to assure the emulsion will stay in suspension.

The additive composition of the present invention exhibits grease and water resistant properties without a fluorinated compound present in the additive composition.

An example of a petroleum wax based aqueous emulsion suitable for use in the composition is a cationic emulsion of a paraffin wax, more particularly a cationic emulsion of a fully-refined paraffin wax. Commercially available suppliers of petroleum wax based aqueous emulsions include, but are not limited to, WE20 of Walker Industries, HY708 of Michelman, Inc., among others.

An example of a food-safe coating formulation is a coating formulation comprising a vinyl acetate-vinyl alcohol polymer. Preferably, the coating formulation has a component selected from the group consisting of a vinyl acetate-vinyl alcohol polymer, isothiazolinone, polyalkylene glycol, and a combination thereof. Examples of commercially available food-safe coating formulations and suppliers include, but are not limited to, MC525 of Michelman, Inc., among others.

A retention aid is used to retain small fibers (fines), filler, and other small particles on a finished sheet in a paper making system as well as to assist in drawing more water during the formation process to reduce dewatering load in the dry section of the paper making machine or system. An example of a retention aid is a cationic polymer, more preferably a cationic polyacrylamide. Commercially available retention aids and their suppliers include, but are not limited to, Bufloc 5321 of Buckman Laboratories International, Inc., Solenis International LLC, among others.

An example of a sizing agent suitable for use in the composition is an alkyl ketene dimer (AKD). Commercially available suppliers of sizing agents include, but are not limited to, Ares Chemical, Kemira Chemicals, among others.

Other additives may be present in the composition or may be added during the process. Examples of other additives include, but are not limited to, a retention aid, a sizing agent, pigments, dyes, other colorants, and a combination thereof.

Referring to the figures, FIG. 1 illustrates an embodiment of a process in accordance with the present invention. A pulp slurry (such as approximately 3% dry weight of pulp and 97% water) comes into a dense bleached pulp tank 50 ("Tank 1"). Dense pulp is added from pulp tank 50 to a mix tank 60. Examples of types of pulp for use in the present invention include, but are not limited to, sugarcane fiber, bagasse, bamboo, wheatstraw, and miscanthus.

Additive 1 is a petroleum wax based aqueous emulsion. Additive 1 in a tank 10 is added to mix tank 60 concurrently with the addition of the dense pulp. A mixer of mix tank 60 is turned on for a period of time, such as for a period of minutes, after completion of the first two addition steps.

Additive 2 is a food-safe coating formulation. Additive 2 in a tank 20 is added to mix tank 60 and mixed for a period of time, such as a period of minutes. Additive 4 is AKD. Additive 4 in a tank 30 is added to mix tank 60 and mixed for a period of minutes. Fresh (tap) water from water recycling pool in tank 80 is added to mix tank 60. It is noted that the mixing period may vary depending upon the size of the tank, viscosity of the pulp slurry, fiber size, among other process parameters.

Additive 3 is a retention aid. Additive 3 in a tank 40 is added concurrently as fresh water is added. Mix tank 60 is mixed after the addition of fresh water and Additive 3. After mixing, a finished mix pulp is pumped to a forming tank 70 from mix tank 60.

Plates may be maintained at top and bottom temperatures of 110° C.

In an alternative method, Additives 1, 2, and 4 are blended together as Additive Composition 1 of tank 5 and subsequently, added to a pulp slurry in a tank or directly into a pipe prior to any other additives and combined post addition into the tank.

In still yet another alternative method, Additives 1 and 4 are blended together as Additive Composition 2 of tank 5 and subsequently added to a pulp slurry in a tank or directly into a pipe prior to any other additives and combined post addition into the tank.

In an embodiment of the invention, a pulp-based composition is provided. The pulp-based composition comprises: 0.1 weight % to 10 weight % of a petroleum wax based aqueous emulsion, 0.1 weight % to 10 weight % of a food-safe coating formulation, 0 weight % to 0.5 weight % of a cationic polymer, 0.1 weight % to 10 weight % of an alkyl ketene dimer, and 69.5 weight % to 99.7 weight % of pulp, wherein weight percentages are based on the total weight of the pulp-based composition.

The resulting pulp-based composition may subsequently be formed or molded into a pulp molded product that is safe for contacting or containing food, also referred to as "food-safe." "Food-safe" generally refers to being safe for contact with food for human consumption.

Among the advantages of the composition of the present invention is that the chemical composition does not use fluorinated compounds to achieve acceptable grease and water resistance. The non-fluorinated containing chemical composition of the present invention achieves grease resistance that is acceptable for most food applications in food service but without the safety risks.

An example of a pulp molded article for containing food or drink includes, but is not limited to a tray, container, clam shell, lid, cup, plate, bowl, utensil such as a serving or eating utensil, or a combination thereof.

Further, the elimination of fluorinated compounds in packaging reduces the sources of these compounds in compost operations which would reduce the risk of human contact.

In an embodiment of the invention, a food-safe article is provided comprising: a natural fiber, an alkyl ketene dimer (AKD), a food-safe coating formulation, and a petroleum wax based aqueous emulsion. The article does not comprise a fluorinated compound.

Preferably, the natural fiber is a sugarcane fiber. The sugarcane fiber can be a bleached/white sugarcane fiber or an unbleached sugarcane fiber. It is contemplated that other natural fibers may be used in accordance with the present invention.

In another embodiment of the invention, the article comprises: 96 weight % to 99.65 weight % of a natural fiber, 0.15 weight % to 1.1 weight % of an alkyl ketene dimer (AKD), 0.1 weight % to 1.9 weight % of a food-safe coating formulation, and 0.1 weight % to 1 weight % of a petroleum wax based aqueous emulsion, wherein the percentages are weight percentages based on dry weight formulation of the article. The article is a food-safe article molded from a pulp composition The article exhibits grease and water resistant properties.

The article can be in various shapes and sizes. Preferably, the article has a thickness of less than 2 millimeters. Preferably, the article has a thickness of at least 0.5 millimeters.

It is a feature of the invention that the article is compostable in an industrial composting facility.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. An article comprising:
   at least 95 weight % of a natural fiber,
   at least 0.15 weight % of an alkyl ketene dimer (AKD),
   at least 0.1 weight % of a petroleum wax based aqueous emulsion,
   and less than 1 weight % vinyl acetate-vinyl alcohol polymer,
   wherein said article exhibits grease resistant properties and is suitable for food contact,
   wherein the article is a pulp molded article.

2. The article according to claim 1, wherein the article is molded from a pulp composition.

3. The article according to claim 1, wherein the article is formed as one of a tray, a container, a lid, a cup, a plate, a bowl, and a utensil.

4. The article according to claim 1, wherein the article is compostable in an industrial composting facility.

5. The article according to claim 1, wherein the article has a thickness of less than 2 millimeters.

6. The article according to claim 1, wherein the article has a thickness of at least 0.5 millimeters.

7. An article comprising:
   96% to 99.65% of a natural fiber,
   0.15% to 1.1% of an alkyl ketene dimer (AKD),
   0.1% to 1.9% of a food-safe coating formulation, and
   0.1% to 1% of a petroleum wax based aqueous emulsion,
   wherein the percentages are weight percentages based on dry weight formulation of the article, and
   wherein the article is a pulp molded article.

8. The article according to claim 7, wherein the article is a food-safe article molded from a pulp composition, the article exhibiting grease and water resistant properties.

9. The article according to claim 7, wherein the pulp composition is characterized by absence of a fluorinated compound.

10. The article according to claim 7, wherein the article is formed as one of a tray, a container, a lid, a cup, a plate, a bowl, and a utensil.

11. The article according to claim 7, wherein the article has a thickness of less than 2 millimeters.

12. The article according to claim 7, wherein the article has a thickness of at least 0.5 millimeters.

* * * * *